US007239695B2

(12) United States Patent
Li

(10) Patent No.: US 7,239,695 B2
(45) Date of Patent: Jul. 3, 2007

(54) METHOD AND APPARATUS FOR DETECTING LINE CARD THRESHOLD

(75) Inventor: Jin Li, Austin, TX (US)

(73) Assignee: Legerity, Inc., Austin, TX (US)

( * ) Notice: Subject to any disclaimer, the term of this patent is extended or adjusted under 35 U.S.C. 154(b) by 1108 days.

(21) Appl. No.: 09/753,343

(22) Filed: Dec. 29, 2000

(65) Prior Publication Data

US 2002/0118819 A1 Aug. 29, 2002

(51) Int. Cl.
*H04M 1/00* (2006.01)
(52) U.S. Cl. .......................... 379/399.01; 379/413.01; 379/418
(58) Field of Classification Search ............ 379/399.01, 379/399.02, 418, 413.01; 710/264, 263
See application file for complete search history.

(56) References Cited

U.S. PATENT DOCUMENTS

| 5,406,623 A * | 4/1995 | Rovik ........................ 379/418 |
| 5,583,934 A * | 12/1996 | Zhou ..................... 379/399.02 |
| 6,219,417 B1 * | 4/2001 | Zhou ........................... 379/382 |
| 6,553,443 B1 * | 4/2003 | Baqai et al. ................ 710/264 |
| 6,590,973 B1 * | 7/2003 | Bijman et al. ......... 379/399.01 |

* cited by examiner

*Primary Examiner*—Jefferey Harold
(74) *Attorney, Agent, or Firm*—Williams, Morgan & Amerson, P.C.

(57) ABSTRACT

A method and apparatus is provided. The method includes transmitting a signal having an AC component to a subscriber line and receiving at least a portion of the transmitted signal from the subscriber line. The method includes determining at least a portion of a period of the AC component of the received signal, and performing a function of a line card in response to determining at least the portion of the period of the AC component. The apparatus includes circuitry that is capable of transmitting a signal having at least one of an AC component and a DC component to a subscriber line, and receiving at least a portion of the transmitted signal from the subscriber line. The apparatus includes a filter and computation logic. The filter is capable of filtering the DC component from the received signal. The computation logic is capable of determining a value proportional to a power of the AC component of the received signal over at least a portion of a period of the AC component. The apparatus further includes logic capable of performing a function of a line card in response to determining the value proportional to the power of the AC component.

28 Claims, 7 Drawing Sheets

METHOD AND APPARATUS FOR DETECTING LINE CARD THRESHOLD

BACKGROUND OF THE INVENTION

1. Field of the Invention

This invention relates generally to telecommunications, and, more particularly, to a method and apparatus for detecting a threshold in a line card, such as ring-trip and fault detection thresholds.

2. Description of the Related Art

In communications systems, particularly telephony, it is a common practice to transmit signals between a subscriber station and a central switching office via a two-wire bidirectional communication channel. A line card generally connects the subscriber station to the central switching office through a subscriber line. At the subscriber end, a telephonic device may be employed to establish communication with a remote user using the subscriber line. The combination of the telephonic device and the subscriber line is commonly referred to as a subscriber loop.

A line card generally includes at least one subscriber line interface circuit (SLIC) as well as a subscriber line audio-processing circuit (SLAC). The SLIC interfaces with the subscriber loop, and the SLAC interfaces with the SLIC. The SLIC and the SLAC carry out the well-known BORSCHT (Battery feed, Overvoltage protection, Ringing, Supervision, Coding, Hybrid, and Test) functions.

Typically, when an end user initiates a call, the line card provides a ringing AC ringing signal and, often, a DC bias signal, to the subscriber loop to ring the telephonic device. In the United States, the AC ringing signal generally varies from a 16 Hz to 66-⅔ Hz, although a 20 Hz signal is commonly used. Other countries may employ a ringing signal of a different frequency than that of the ringing signal employed in the United States. For example, in European countries, the ringing signal is 25 Hz. The ringing signal can either be internally or externally generated.

While applying the ringing signal to the subscriber loop, the line card also detects an off-hook condition of the telephonic device. Upon detection of an off-hook event, the line card terminates the transmission of the ringing signals within a predetermined amount of time, which is generally within 200 ms of detecting the off-hook condition. The process of transmitting a ringing signal and then detecting the switch-hook condition of the telephonic device is referred to as ring-trip detection.

Aside from ring-trip detection, line cards perform a variety of other key functions using signals of varying frequency. One such function is AC-fault detection. The purpose of AC-fault detection is to ensure that there are no undesirable interrupts caused by an AC disturbance signal, such as a power line signal or a rail system signal. For AC-fault detection, line cards employ a signal having a frequency of 16.67 Hz, 50 Hz, or 60 Hz.

To perform ring-trip detection, AC-fault detection, or other key functions, line cards generally transmit a signal to the subscriber loop and then calculate a power of a received signal. For example, ring-trip detection is determined by comparing the calculated power of the received ringing signal to a threshold value. Similarly, AC-fault detection and other line functions may also require calculation of the power of the received signal. The power calculation is usually based on a computation of one complete cycle of the received signal, which means that it is desirable to know a period (or frequency) of the received signal.

Line cards are generally designed to operate in multiple countries, and should therefore be robust enough to conform to the requirements of individual countries. Line cards should be flexible enough to comply with the different frequency requirements in different countries for functions such as ring-trip detection, AC-fault detection, and the like. And, since the power calculation is generally calculated for one period of the received signal, it becomes increasingly difficult for designers to calculate power for signals of varying frequencies.

To account for the different frequency requirements, one method employed by designers is to calculate power based on a compromise between the various frequencies. For example, for ring-trip detection, line cards utilize an integration time of 44 ms, which correlates to a signal having a frequency of 22.5 Hz, an average of a 20 Hz signal (i.e., frequency commonly employed in U.S.) and 25 Hz signal (i.e., frequency utilized in European countries). Thus, the ring-trip detection under this method is based on a period of 44 milliseconds. Likewise, for AC-fault detection, the line cards may employ an integration time of 100 ms, which is a compromise between the 50 Hz and 60 Hz signals. In some instances an integration time of 60 ms may be employed, which is a compromise between the 16.67 Hz and 50 Hz signal. This method of utilizing compromising integration times for ring-trip detection and AC-fault detection, for example, may result in at least 10% false detections.

Since signals of varying frequencies are employed in a line card for a variety of functions, the power calculation may not always be accurate. One way of improving power calculation in a line card is to allow an end user to input the exact period of the signal employed. This, however, requires not only additional hardware interface support, but also places an added burden on the end user. For instance, the end user will have to know the exact frequency, and hence, the exact period, of the signal being employed.

The present invention is directed to overcoming, or at least reducing the effects of, one or more of the problems set forth above.

SUMMARY OF THE INVENTION

In one aspect of the present invention, a method is provided. The method includes transmitting a signal having an AC component to a subscriber and receiving at least a portion of the transmitted signal from the subscriber line. The method further includes determining at least a portion of a period of the AC component of the received signal, and performing a function of a line card in response to determining at least the portion of the period of the AC component.

In another aspect of the present invention, an apparatus is provided. The apparatus includes circuitry that is capable of transmitting a signal having at least one of an AC component and a DC component to a subscriber line, and receiving at least a portion of the transmitted signal from the subscriber line. The apparatus further includes a filter and computation logic. The filter is capable of filtering the DC component from the received signal. The computation logic is capable of determining a value proportional to a power of the AC component of the received signal over at least a portion of a period of the AC component. The apparatus further includes logic capable of performing a function of a line card in response to determining the value proportional to the power of the AC component.

BRIEF DESCRIPTION OF THE DRAWINGS

The invention may be understood by reference to the following description taken in conjunction with the accompanying drawings, in which like reference numerals identify like elements, and in which.

Figure 1:
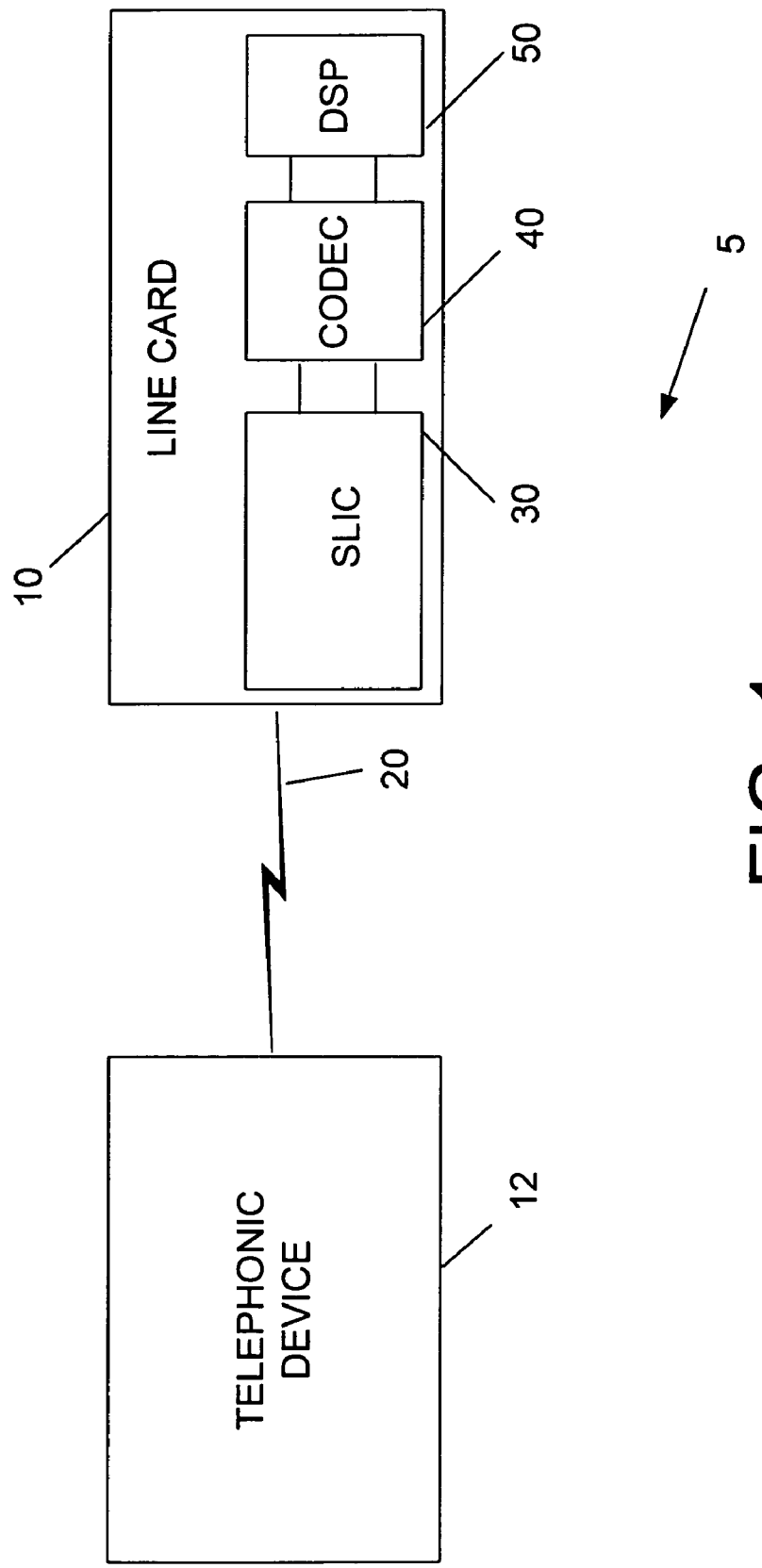
FIG. 1 illustrates a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring first to FIG. 1, a simplified block diagram of a communications system 5 in accordance with the present invention is provided. The communications system 5 includes a line card 10 that interfaces with a telephonic device 12 over a subscriber line 20. In an actual implementation, the line card 10 interfaces with a plurality of subscriber lines 20, but for clarity and ease of illustration, only one is shown. In accordance with the present invention, the line card 10 is capable of providing a reliable method of ring-trip detection and AC-fault detection based on a received ringing signal and fault-detection signal, respectively. Additionally, the line card 10 may perform other functions reliably, particularly functions that rely on power calculation.

A subscriber line interface circuit (SLIC) 30 is coupled to the subscriber line 20. Hereinafter, signals received by the line card 10 over the subscriber line 20 are referred to as upstream signals, and signals transmitted by the line card 10 on the subscriber line 20 are referred to as downstream signals. The SLIC 30 supplies an analog upstream signal to a coder/decoder (CODEC) 40. The CODEC 40 receives the analog upstream signal from the SLIC 30 and generates a digital upstream signal that is subsequently passed to a digital signal processor (DSP) 50. The DSP 50 also provides a digital signal for eventual transmission on the subscriber line 20. The CODEC 40 receives the digital signal, converts it to an analog signal, and provides the analog signal to the SLIC 30, which sends the analog signal over the subscriber line 20.

In the illustrated embodiment, the line card 10, in addition to supporting plain old telephone service (POTS), is adapted to implement an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (ADSL) Metallic Interface." The SLIC 30 of the line card 10 is capable of performing a variety of functions, such as battery feed, overload protection, polarity reversal, on-hook transmission, and current limiting. Only relevant portions of the SLIC 30, CODEC 40, and DSP 50 are described herein, although those of ordinary skill in the art will appreciate that these devices may perform other functions that are not described in this disclosure.

The telephonic device 12 may comprise a telephone or any other device capable of providing a communication link between at least two users. In one embodiment, the telephonic device 12 may be one of a variety of available conventional telephones, such as wired telephones and similar devices. In an alternative embodiment, the telephonic device 12 may be any device capable of performing a substantially equivalent function of a conventional telephone, which may include, but is not limited to, transmitting and/or receiving voice and data signals. Examples of the telephonic device 12 include a data processing system (DPS) utilizing a modem to perform telephony, a television phone, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
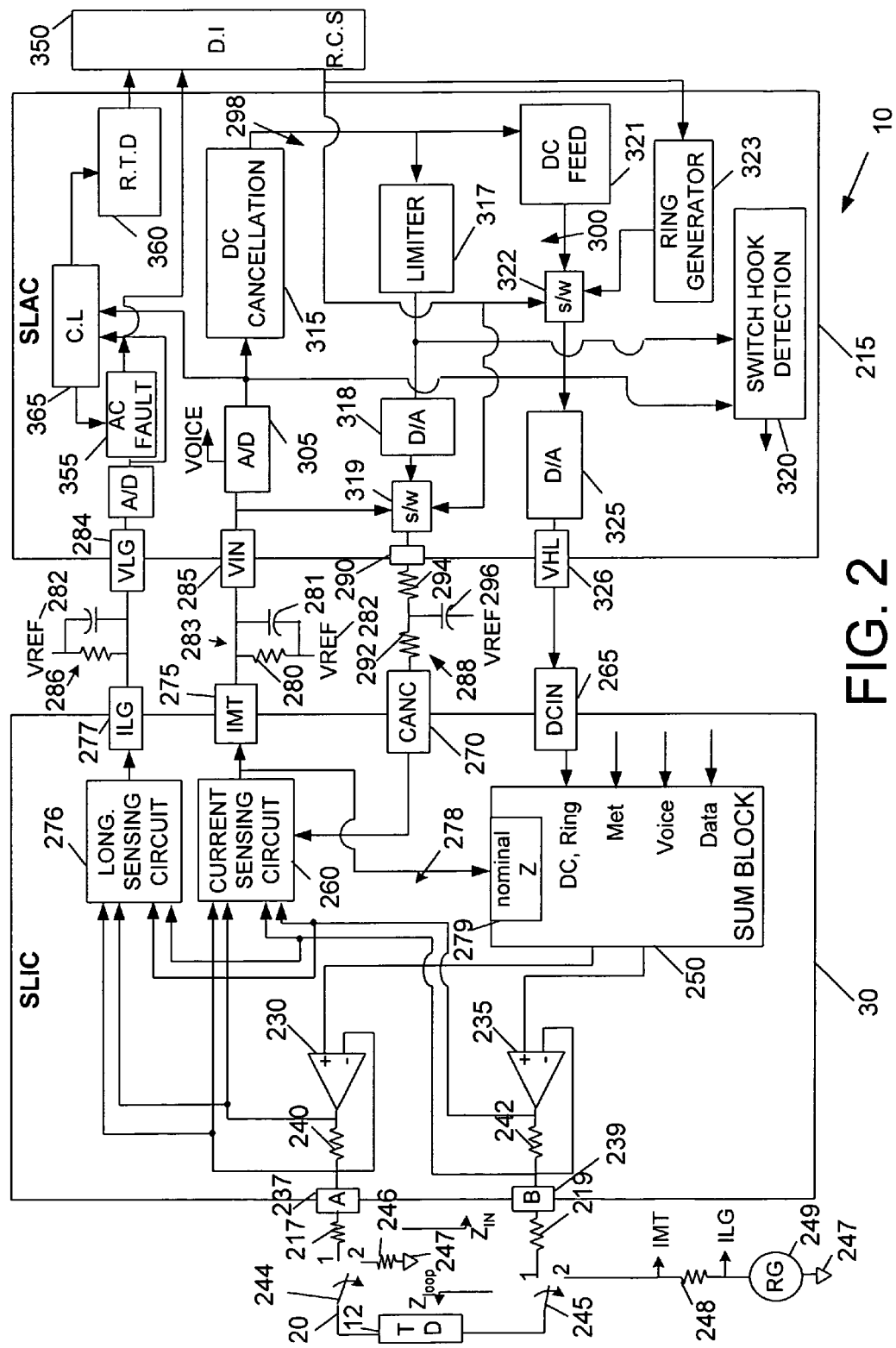
FIG. 2 depicts a block diagram of an embodiment of a line card in accordance with the present invention that can be implemented in the communications system of FIG. 1.

FIG. 2 illustrates one embodiment of the line card 10 in accordance with the present invention. Specifically, the line card 10 includes the SLIC 30, which, in the illustrated embodiment, is a voltage-feed SLIC. The line card 10 also includes the CODEC/DSP 40, 50, which in the illustrated embodiment are shown as a subscriber line audio-process circuit (SLAC) 215 that integrates the functions of both the CODEC and DSP 40, 50. The line card 10 may be located at a central office or a remote location somewhere between the central office and the telephonic device 12 (see FIG. 1). The line card 10 interfaces with the telephonic device 12 through tip and ring terminals 237, 239 at the SLIC 30. The combination of the telephonic device 12 and the subscriber line 20 is generally referred to as a subscriber loop.

The impedance of the subscriber line 20 is herein denoted as $Z_{LOOP}$, and the impedance seen by an incoming signal from the subscriber line 20 is hereinafter referred to as $Z_{IN}$.

The value of $Z_{LOOP}$, which is determined by individual telephone authorities in various countries, may be in the range of 600–900 ohms for the POTS band and in the range of 100–135 ohms for the xDSL band. The SLIC 30 is adapted to be coupled to first and second resistors 217, 219, which are utilized to define the input impedance.

The line card 10, which may be capable of supporting a plurality of subscriber lines 20, performs, among other things, two fundamental functions: DC loop supervision and DC feed. The purpose of DC feed is to supply enough power to the telephonic device 12 at the customer end. The purpose of DC loop supervision is to detect changes in DC load, such as on-hook events, off-hook events and rotary dialing, or any other event that causes the DC load to change. In the interest of clarity and to avoid obscuring the invention, only that portion of the line card 10 that is helpful to an understanding of the invention is illustrated.

The voltage-feed SLIC 30 is a high voltage bipolar SLIC that drives voltages to the subscriber line 20 and senses current flow in the subscriber line 20. The SLIC 30 includes first and second differential line drivers 230, 235 that interface with the subscriber line 20 via tip and ring terminals 237, 239. The tip terminal 237 is coupled to a first terminal of a first sensing resistor ($R_{ab}$) 240 and to an inverting terminal of the first line driver 230. A second terminal of the first sensing resistor 240 is coupled to an output terminal of the first line driver 230. The ring terminal 239 is coupled to a first terminal of a second sensing resistor ($R_{bd}$) 242 and to an inverting terminal of the second line driver 235. A second terminal of the second sensing resistor 242 is coupled to an output terminal of the second line driver 235.

The line card 10 is adapted to provide external ringing. FIG. 2 illustrates a first switch 244 and second switch 245 for toggling between internal ringing and external ringing. During external ringing, the first and second switches 244, 245 are in position 2, and during normal operation or internal ringing, the switches 244, 245 are in position 1. When in position 2, the first switch 244 is coupled to a first terminal of a resistor 246, which has a second terminal coupled to a ground node 247. The second switch in position 2 is coupled to a first terminal of a resistor 248, which has a second terminal coupled to a first terminal of an external ringing generator 249. A second terminal of the external ringing generator 249 is coupled to the ground node 247. For internal ringing, the switches 244, 245 are in position 1, and the line card 10 internally generates a ringing signal and provides it to the subscriber loop 20.

The SLIC 30 includes a sum block 250 and a current-sensing circuit 260. The sum block 250 includes a first output terminal coupled to a non-inverting terminal of the first line driver 230, and a second (inverted) output terminal coupled to a non-inverting terminal of the second line driver 235. The sum block 250 is capable of receiving a DC feed signal (as well as ringing signals) from a DCIN terminal 265, a voice signal, a metering signal, and a data signal and is capable of adding one or more of the received signals and providing it to the first and second line drivers 230, 235. The signals into the SUM block 250 may be subjected to different levels of gain for optimal performance. The signal from the DCIN terminal 265 is low-pass filtered.

The current-sensing circuit 260 produces a current proportional to the current through the current sensing resistors 240, 242, subtracts a current proportional to a current from a cancellation terminal (CANC) 270, and provides the resulting (metallic) current to an IMT terminal 275 of the SLIC 30. Although not so limited, in the instant embodiment, the constant of proportionality for the current from the cancellation terminal (CANC) 270 is unity, and the constant of proportionality for the metallic line current is 0.001. Those skilled in the art will appreciate that only those portions of the SLIC 30 deemed relevant to the invention are disclosed herein. The SLIC 30 may employ other circuitry that is not illustrated in FIG. 2.

The SLIC 30 includes a longitudinal sensing circuit 276 that provides a current proportional to the current through the current sensing resistors 240, 242. Specifically, the longitudinal sensing circuit 276 adds the current flowing through the current sensing resistors 240, 242, divides the sum by two, and provides the resulting longitudinal current to an ILG terminal 277 of the SLIC 30. Although not so limited, in the instant embodiment, the constant of proportionality for the longitudinal line current is 0.001.

The SLIC 30 includes a first impedance matching loop 278 that adjusts a nominal value of the input impedance ($Z_{IN}$) to substantially match the impedance of the subscriber line 20. The first impedance matching loop 278 includes a nominal Z block 279 that receives the output signal of the current sensing circuit 260 and provides a selected amount of "fixed" gain and delay to adjust a nominal value of the input impedance $Z_{IN}$. In the illustrated embodiment, the nominal Z block 279 sets the nominal value of the input impedance to a fixed value of 900 ohms, which includes the resistance provided by resistors 217, 219, 240 and 242.

The SLIC 30 is connected to the SLAC 215 as well as to an external resistor 280, as well as to a capacitor 281. In the illustrated embodiment, the resistor 280 is 100,000 ohms. A first terminal of the resistor 280 is coupled to the IMT terminal 275 of the SLIC 30, as well as to the VIN terminal 285 of the SLAC 215. A second terminal of the resistor 280 is coupled to a reference voltage node 282, as well as to a terminal of the capacitor 281. In one embodiment, the reference voltage 282 is in the range of about 1.4 volts. The external resistor 280 and the capacitor 281 form a single-pole low pass filter 283 that is capable of filtering at least a portion, if not all, of the signals above the voice band, such as data signals and metering signal. The external resistor 280 and the capacitor 281 convert the current flowing from the IMT terminal 275 to a proportional voltage signal for the SLAC 215. Although not necessary, the resistor 280 is external in the illustrated embodiment because in some embodiments it may be useful for the drive value of the resistor to be relatively precise and because each line card 10 may require different values.

The ILG terminal 277 of the SLIC 30 is connected to a VLG terminal 284 of the SLAC 215 as well as to a filter 286. The impedance of the filter 286 converts the current flowing from the ILG terminal 277 to a proportional voltage signal for the SLAC 215. The filter 286 removes undesirable frequencies such as those above the voice band. Although not so limited, the cutoff frequency of the filter 286 is about 5.3 KHz. The filter 286 is capable of filtering high frequencies, such as the radio frequency noise. The filter 286, however, is capable of allowing power line AC noise.

A discrete network 288 couples the SLIC 30 to the SLAC 215 via the CANC terminals 270, 290. The discrete network 288 includes a first and second resistor 292, 294 and a capacitor 296. A first terminal of the first resistor 292 is coupled to the CANC terminal 270 of the SLIC 30 and a second terminal of the first resistor 292 is coupled to a first terminal of the second resistor 294. The second terminal of the second resistor 294 is coupled to the CANC terminal 290 of the SLAC 215. The capacitor 296 is coupled between the second terminal of the first resistor 292 and the reference voltage node 296. The discrete network 288 acts as a low pass filter and converts the voltage output signal from the SLAC 215 to a current and provides it to the SLIC 30.

The SLAC 215 interfaces with the telephonic device 12 through the SLIC 30 and over the subscriber line 20. The SLAC 215 includes two feedback loops: a DC cancellation loop 298 and a DC feed loop 300. In the illustrated embodiment, the two loops 298, 300 are implemented within a digital signal processor (DSP). Only those portions of the SLAC 215 deemed relevant to the instant invention are described herein, albeit the SLAC 215 may perform a variety of other functions that are not illustrated in FIG. 2.

The DC cancellation loop 298 includes an analog-to-digital converter 305, DC cancellation logic 315, a current limiter 317, a digital-to-analog converter 318, and a switch 319. The switch 319, during a non-ringing mode, allows an output signal of the digital-to-analog converter 318 to pass to the CANC terminal 290 of the SLAC 215. In contrast, during a ringing mode, and as is described in more detail below, the switch 319 couples the VIN and CANC terminals 285, 290 of the SLAC 215, thereby disengaging the DC cancellation loop 298 from the CANC terminal 290.

In the illustrated embodiment, to reduce hardwire complexity, the voice and DC components of the input signal from the VIN terminal 285 share the same analog-to-digital converter 305. The analog-to-digital converter 305 and digital-to-analog converter 318 include a decimator and interpolator, respectively. The analog-to-digital converter 305 in the illustrated embodiment is capable of providing two output signals, the first output signal is sampled at a 4 KHz frequency and provided as a digital signal to the DC cancellation logic 315, as well as to a switch hook detection logic 320. The second output signal of the analog-to-digital converter 305, comprised of voice and/or data (residual) components, is sampled at 32 KHz and provided to a CODEC (not shown). A residual data component may exist at the output of the analog-to-digital converter 305 since the single-pole low pass filter 283 may not remove the entire data signal.

During the non-ringing mode, the DC cancellation logic 315 receives the digital signal from the analog-to-digital converter 305, filters high frequencies, and provides substantially a DC signal. The DC signal is provided as an input to the DC feed logic 321, as well as to the current limiter 317. The output of the current limiter 317 is converted to an analog signal and then provided back to the SLIC 30 via the CANC terminal 270. The output of the current limiter 317 is also provided to the switch hook detection logic 320 for switch hook detection. The current provided to the CANC terminal 270 of the SLIC 30 is used to cancel the DC component of the signal from the current sensing circuit 260. Thus, during a "stable" state (ie., no transients present), the signal at the VIN terminal 285 of the SLAC 215 is essentially DC free.

The DC feed loop 300, in addition to the analog-to-digital converter 305 and DC cancellation logic 315, includes DC feed logic 321, a switch 322, and a digital-to-analog converter 325. In the illustrated embodiment, the digital-to-analog converter 325 may also interpolate. During the non-ringing state, the switch 322 provides an output signal from the DC feed logic 321 to the digital-to-analog converter 325. However, as will be described in more detail below, during the ringing state, the switch 322 disengages the output of the DC feed logic 321, and, instead, provides a ringing signal generated by a ring generator 323 to the digital-to-analog converter 325. The output from the digital-to-analog converter 325 is provided to a DCIN terminal 265 of the SLIC 30 via VHL terminal 326 of the SLAC 215. The DC feed logic 321 is capable of providing high DC voltage to the subscriber loop so that sufficient current (20–60 mA) can be driven through a resistance as high as 2K ohms.

When the DC conditions on the subscriber loop change suddenly, the DC feed logic 321 adapts to the change, thereby allowing normal transmission to continue. Examples of sudden changes in DC conditions include on-hook, off-hook, rotary dialing, and tone signaling. When the telephonic device 12 goes off-hook, the loop impedance drops almost instantly to a value below 2K ohms. In short subscriber loops, the loop impedance may be less than 200 ohms. For the line card 10 to function and transmit information properly, the DC conditions on the subscriber loop should be stabilized quickly, and in some cases, within milliseconds.

Figure 3:
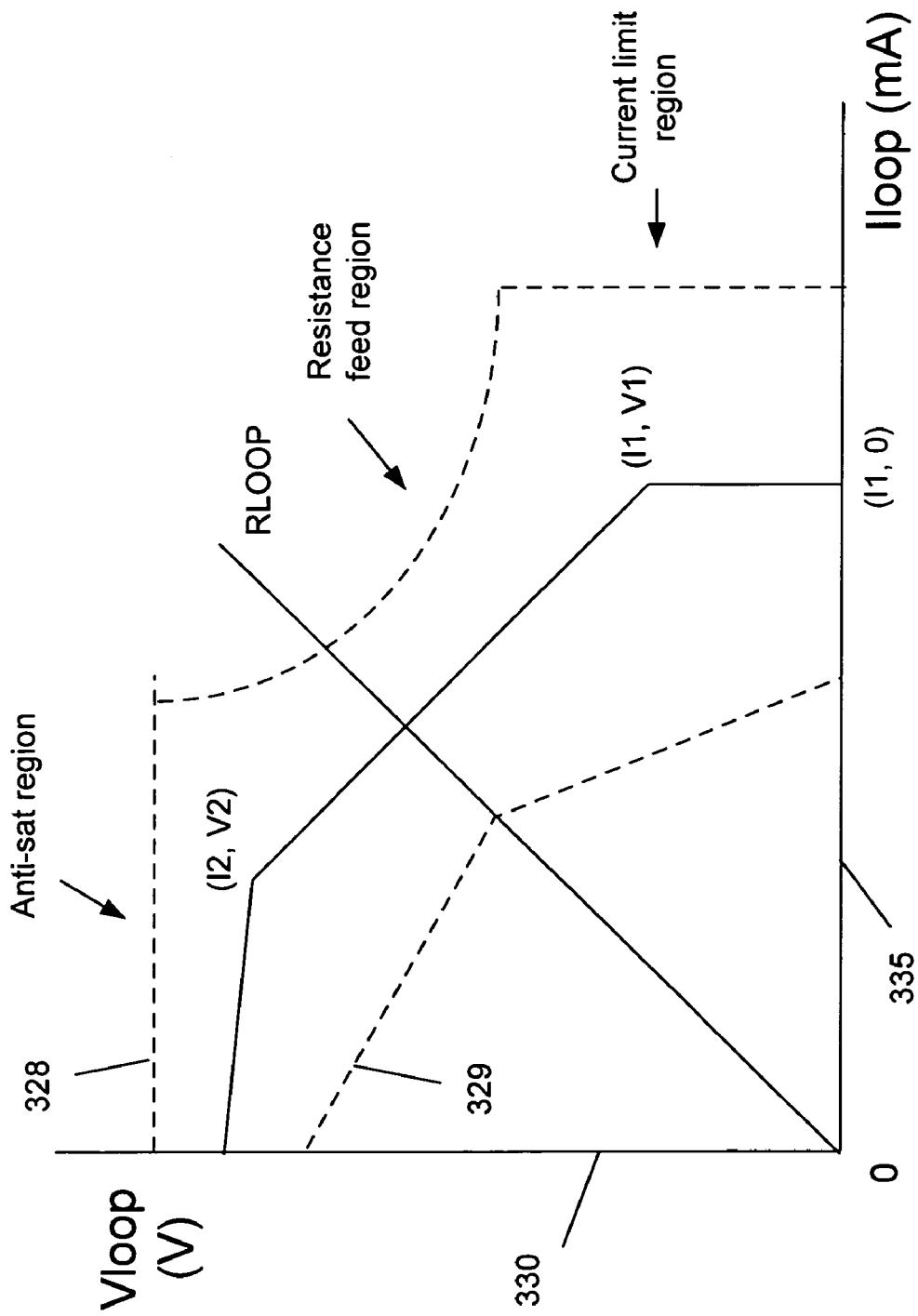
FIG. 3 depicts an exemplary DC feed curve that may be employed by the line card of FIG. 2.

FIG. 3 illustrates an exemplary DC feed curve that may be adapted for use by the DC feed logic 321. A dashed line 328 provides the upper limits for the electrical power, and a dashed line 329 provides the lower limits for the electrical power provided to the subscriber loop. A Y-axis 330 represents voltage, and an X-axis 335 represents current. As can be seen in FIG. 3, although not so limited, the DC feed curve includes an anti-saturation region, a resistance feed region, and a current limit region.

Referring again to FIG. 2, when the line card 10 is in a "stable" state (i.e., no transients), the signal at the VIN terminal 285 of the SLAC 215 comprises primarily a voice signal, although it may include residual metering and data signals that are not removed by the single-pole low pass filter 283. This single-pole low pass filter 283 provides an adequate performance by attenuating the data and metering signals to acceptable levels. Aside from being more cost-effective than higher order low-pass filters, the single-pole low pass filter 283 also provides an added advantage in that it does not make the line card 10 unstable.

The line card 10 operates in at least two modes, a non-ringing mode and a ringing mode. A digital interface 350, which includes a processor (not shown), controls the operation mode of the line card 10. For example, when a remote user places a call to the telephonic device 12, the central office instructs the digital interface 350 to ring the telephonic device 12. Accordingly, in response to the request from the central office, the digital interface 350 provides a ring control signal to switches 319, 322, as well as to the ring generator 323. During the ringing mode, the switch 319 couples the VIN and CANC terminals 285, 290 of the SLAC 215, and the switch 322 couples the ring generator 323 to the digital-to-analog converter 325, which then converts the ringing signal into a digital signal before it is provided to the subscriber loop 30. In contrast, during the non-ringing mode, when no ringing control signal is provided, the switches 319, 322 connect the respective DC cancellation and DC feed loops 298, 300 to the respective CANC and VHL terminals 290, 326 of the SLAC 215.

In response to receiving the ringing control signal, the ring generator 323 of the line card 10 provides an internal ringing signal to the subscriber loop 30. Thus, the first and second switches 244, 245 are set to position 1. In response to the ringing control signal from the digital interface 350, the switch 319 couples the VIN terminal 285 to the CANC terminal 290 of the SLAC 215, thereby shielding the DC cancellation loop 298 from high voltages and currents commonly associated with ringing signals. Typically, for voice and data operation, the voltage at the VIN terminal 285 may reach a maximum of 50 volts DC when no current is flowing, which is a voltage level that may be handled by the DC cancellation loop 298. In contrast, a ringing signal, which commonly comprises a 20 Hz signal along with a DC offset, may be a peak (AC) 100 volts plus 20–30 volts DC signal, a voltage level that is too high for the DC cancellation loop 298. Accordingly, connecting the VIN and CANC terminals 285, 290 of the SLAC 215 aids in lowering the current level to the DC cancellation loop 298.

The impedance provided by the discrete network 288 at the CANC terminal 290 of the SLAC 215 is relatively low, approximately 16–17 ohms. So, when the VIN and CANC terminals 285, 290 are shorted, the relatively low impedance of the discrete network 288 lowers the impedance seen at the VIN terminal 285, which is set primarily by the 100,000-ohm resistor 280. This is because adding a high and low impedance in parallel has a net effect of lowering the impedance. As a result of lower impedance, the voltage level present at the VIN terminal 285 during the ringing mode is generally at a lower level. Furthermore, the current sensing circuit 260 of the SLIC 30 aids in further reducing the voltage level at the VIN terminal 285, perhaps by half. By lowering the impedance during the ringing mode, the line card 10 is able to handle currents of higher level, typically up to 130 mA.

In essence, shorting the VIN and CANC terminals 285, 290 allows the line card 10 to toggle between a low current configuration to a high current configuration. Without the VIN and CANC terminals 285, 290 shorted, the line card 10 can support a current of approximately 61 mA, whereas with the terminals 285, 290 shorted, the line card 10 can handle a current of approximately 130 mA, which is adequate for ringing.

The SLAC 215 includes AC-fault detection logic 355, ring-trip detection logic 360, and computation logic 365. The AC-fault detection logic 355, ring-trip detection logic 360, and computation logic 365 are shown as functional blocks in FIG. 2 for illustrative purposes only. It should be appreciated that in actual implementation these blocks are implemented in software within the digital signal processor 50 (see FIG. 1).

The computation logic 365 receives a digital version of the signal from the VLG terminal 284 of the SLAC, as well as the digital version of the signal from the VIN terminal 285. As is described in more detail below, the computation logic 365 computes a value based on the signal from the VIN terminal 285 that is later utilized by the ring-trip detection logic 360 for ring-trip detection. Likewise, the computation logic 365 computes a value based on the digital signal received from the VLG terminal 284 that is utilized by the AC-fault detection logic 355 for AC-fault detection.

Figure 4:
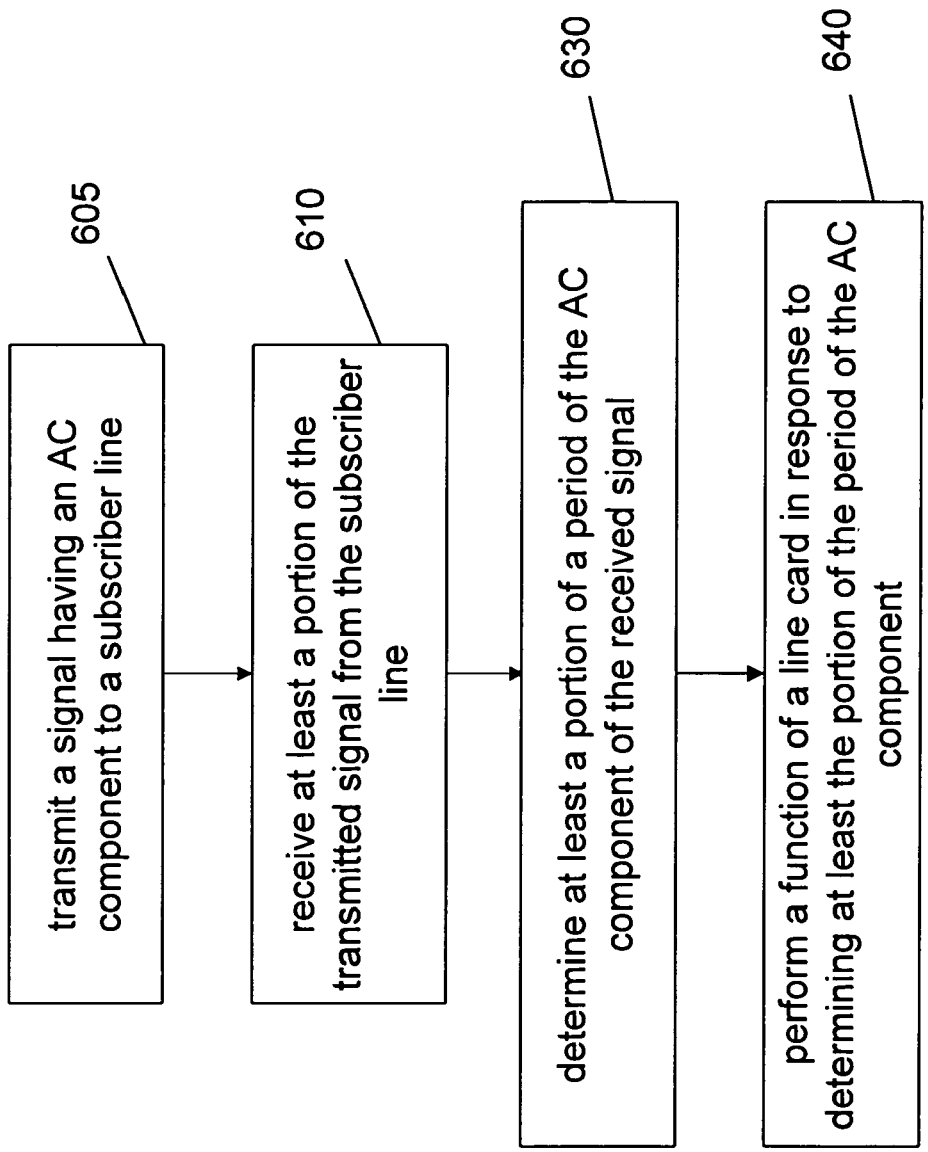
FIG. 4 illustrates an embodiment of a method that may be employed by the line card of FIG. 2.

Referring now to FIG. 4, a method in accordance with the present invention is illustrated. The line card 10 is capable of employing the method of FIG. 4 for ring-trip detection or AC-fault detection. The method begins at block 605, where the line card 10 transmits a signal having an AC component to the subscriber line 30. In one embodiment, the signal may be a ringing signal that is generated by the internal ring generator 323, or, alternatively, by the external ring generator 249. In another embodiment, the signal may be an AC-fault detection signal that is utilized for AC-fault detection.

At block 610, the line card 10 receives at least a portion of the transmitted signal from the subscriber line 30. Thus, the line card 10 receives at least a portion, if not all, of the ringing signal. Alternatively, the line card 10 receives at least a portion, if not all, of the AC-fault detection signal. At block 630, the computation logic 365 of the line card 10 determines at least a portion of a period of the AC component of the received signal. That is, as described in more detail below, computation logic 365, using a well-known "zero crossing technique," computes the frequency, and hence the period, of the AC component of the received signal.

At block 640, the ring-trip detection logic 360 performs ring-trip detection in response to the computation logic 365 determining at least the portion of the period of the AC component of the received signal. Or, alternatively, the AC-fault detection logic 355 performs AC-fault detection in response to determining at least the portion of the period of the AC component. Typically, ring-trip detection and AC-fault detection is based on comparing a threshold value to the power of the AC component signal. Thus, if the frequency or period of the AC component signal is known, it is possible to calculate the power with higher precision. And, using the calculated power, it is possible to determine ring-trip and AC-fault detection.

Figure 5:
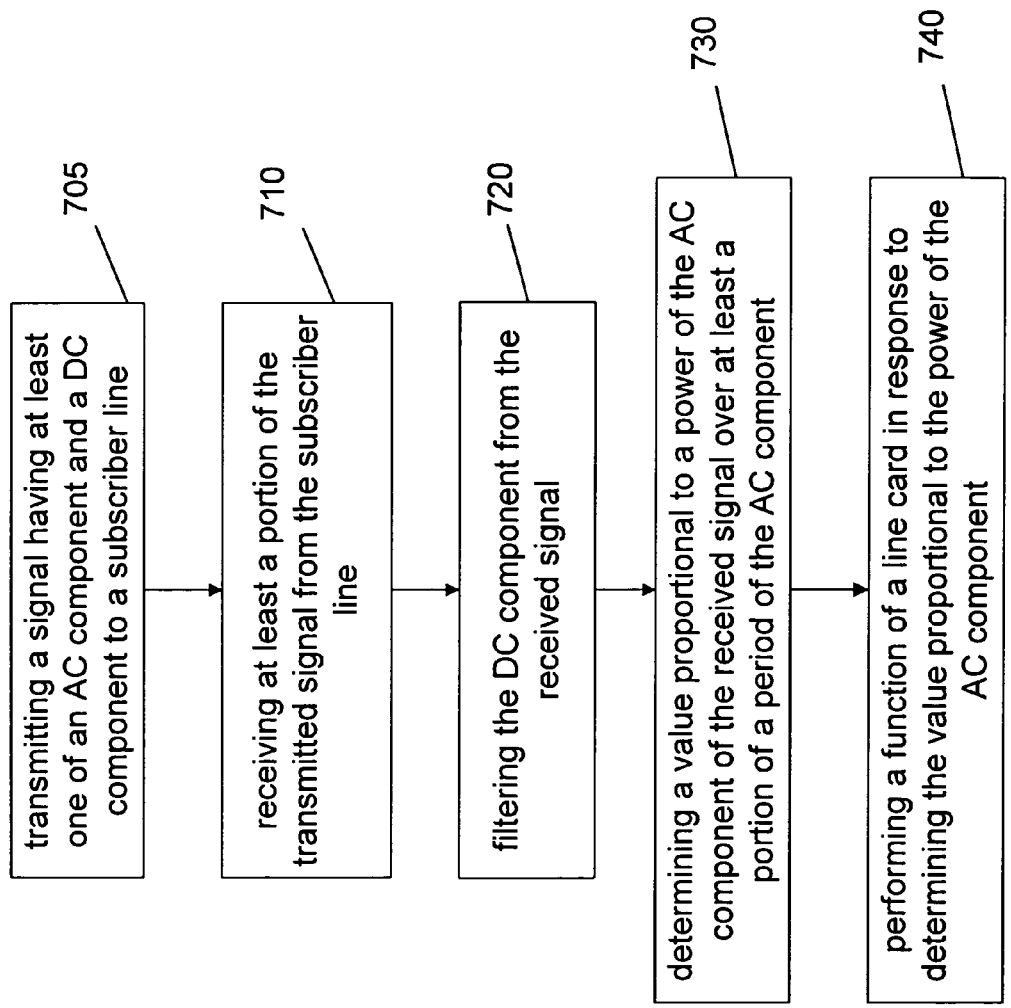
FIG. 5 illustrates an alternative method in accordance with the present invention that may be implemented by the line card of FIG. 2.

Referring now to FIG. 5, an alternative embodiment of a method in accordance with the present invention is illustrated. The line card 10 is capable of employing the method of FIG. 5 for ring-trip detection, AC-fault detection, or any other function for which it may be useful to know the period or frequency of a signal. The method begins at block 705, where the line card 10 transmits a signal having at least one of an AC component and a DC component to the subscriber line 30. In one embodiment, the signal may be a ringing signal that is generated by the internal ring generator 323, or, alternatively, by the external ring generator 249. In another embodiment, the signal may be an AC-fault detection signal that is utilized for AC-fault detection.

At block 710, the line card 10 receives at least a portion of the transmitted signal from the subscriber line 30. Thus, the line card 10 receives at least a portion, if not all, of the ringing signal. Alternatively, the line card 10 receives at least a portion, if not all, of the AC-fault detection signal. At block 720, the computation logic 365 filters the DC component from the received signal. The DC component may be removed using a low pass filter (not shown). For example, a 2 Hz low-pass filter (not shown) may be utilized to filter the DC component of the ringing signal, and a 5 Hz low-pass filter (not shown) may be utilized to filter the DC component of the AC-fault detection signal. An exemplary frequency domain function for the 2 Hz filter may be $H(z) = 0.00390625/(1-1.0375z^{-1}+0.941406z^{-2})$, and for the 5 Hz filter may be $H(z) = 0.8819 \ast (1-z^{-1})/(1-0.8819z^{-1})$.

Figure 6:
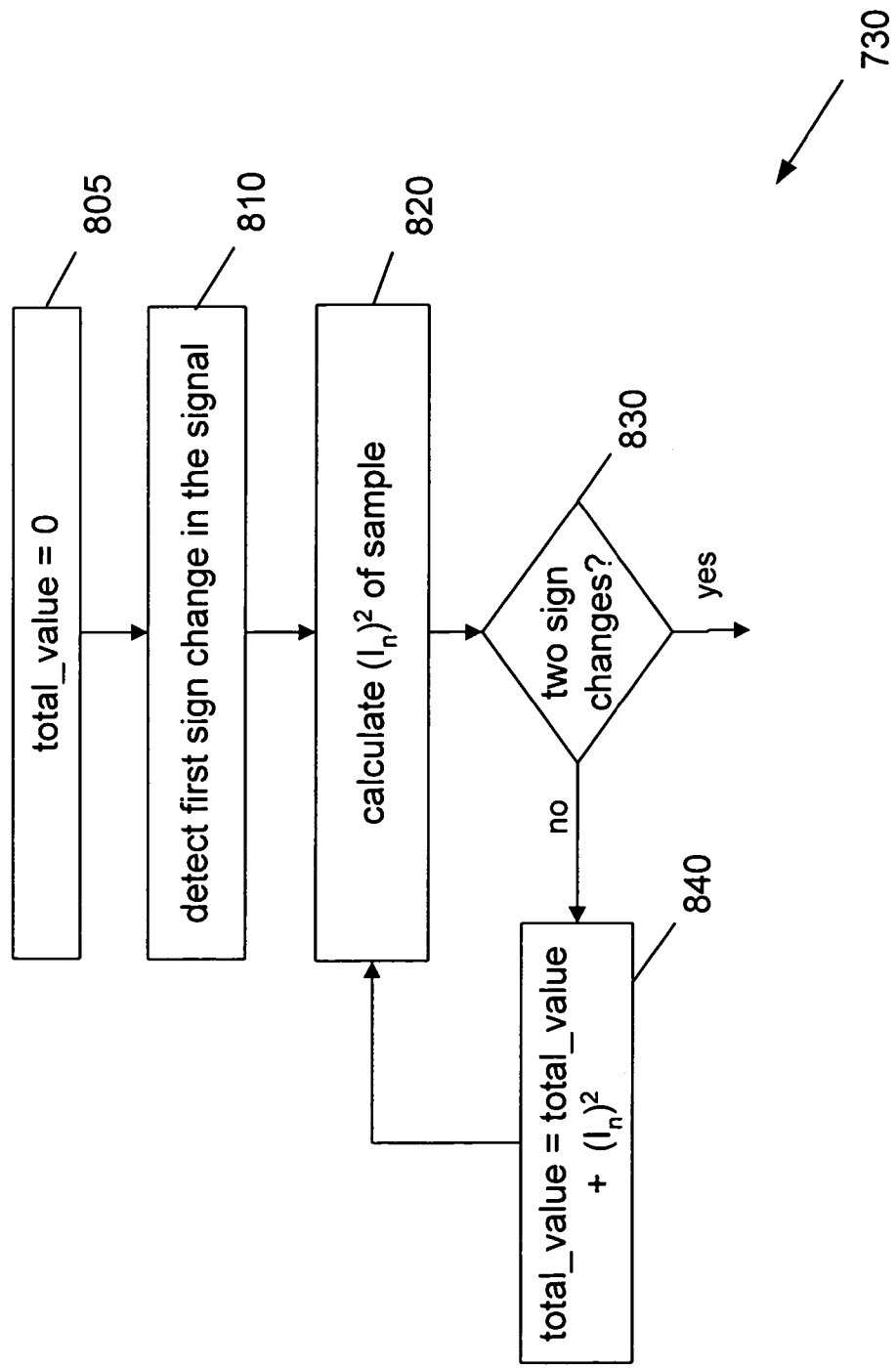
FIG. 6 depicts a specific embodiment of the method of FIG. 5.

At block 730, the computation logic 365 of the line card 10 determines a value proportional to a power of the AC component of the received signal over at least a portion of a period of the AC component. FIG. 6 illustrates a specific embodiment of the block 730. FIG. 6 illustrates a method in which the computation logic 365 utilizes the zero crossing technique to calculate the value that is proportional to the power of the AC component. For the purposes of this illustration, it is assumed that the input to the computation logic 365 is an AC current, which, as mentioned above, may represent the received ringing signal or AC-fault detection signal. It should be noted that an AC voltage signal representative of the ringing or AC-fault detection signal may also be employed without deviating from the spirit and scope of the present invention. The power of the AC component of the received signal may be calculated using equation (1), as shown below:

$$P = 1/T \sum_{n=1}^{T} I(n) \wedge 2 X\, Rsense, \tag{1}$$

where T is a period over which the power is being calculated, I is the AC component of the received signal, and Rsense is the sensing resistance. In one embodiment, the computation logic 365 calculates the power of the AC component for a given period. In another embodiment, the computation logic 365 calculates the value of $I_n^2$ for a given period, since Rsense is a constant. That is, it is possible to calculate the value of $I_n^2$ (as opposed to the power) for a given period and then use that value for threshold detection, as described in more detail below.

For ringing, $I_n$ may be calculated using equation (2) below:

$$I_N = V_{IN}/(KIMT*(1/R_{eq} + 2/R_{cn})), \tag{2}$$

where $V_{IN}$ is the voltage at the VIN terminal 285 of the SLAC 215, KIMT is the metallic current gain to the IMT terminal 275 of the SLIC 30, $R_{eq}$ is the DC impedance between the IMT terminal 275 of the SLIC 30 and the Vref node 282, and $R_{cn}$ is the summation of the resistors 292, 294. Although not so limited, in the illustrated embodiment, the KIMT is 0.001, resistors 292, 294 are 8.25 Kohms each, and $R_{eq}$ is approximately 115.7 Kohms.

For AC-fault calculation, $I_n$ may be calculated using equation (3) below:

$$I_n = 2*VLG/(KILG*RLG), \tag{3}$$

where VLG represents the voltage at the VLG terminal 284 of the SLAC 215, RLG is the DC impedance between the ILG terminal 277 of the SLIC 30 and the Vref node 282. The value of the RLG is thus defined by the impedance of the filter 286 between the ILG and VLG terminals 277, 284. Although not so limited, in the illustrated embodiment KLG is 0.0001.

At block 805, a "total_value" variable is initialized. At block 810, the computation logic 365 detects a first sign change in the AC component (e.g., $I_n$) of the received signal. At block 820, the computation logic 365 calculates the value of $I_n^2$. At block 830, the computation logic checks to see if two sign changes in the AC component of the received signal have occurred. Two sign changes are an indication that one cycle of the AC component of the received signal is complete. Although the value of $I_n^2$ is computed over one complete cycle, it is envisioned that this value may be computed over other intervals as well, including for less than one complete cycle. If at the block 820, two sign changes have not yet occurred, an indication that one cycle is not complete, then, at block 840, the computation logic 365 keeps a running total of the value of $I_n^2$ by adding the previous samples. If at the block 820, two sign changes have occurred, then the value represented by the "total_value" variable is provided to block 740 of FIG. 5.

Referring again to FIG. 5, at block 740, a function of the line card 10 is performed in response to determining the value (represented by "total_value" variable) proportional to the power of the AC component. The function may be a ring-trip detection or an AC-fault detection, for example. Assuming that the received signal is a ringing signal, the ring-trip detection logic 360, based on the value calculated by the computation logic 365, performs ring-trip detection. That is, the ring-trip detection logic 360 compares the value with a threshold value, and if the value exceeds the threshold value, the ring-trip detection logic 360 indicates so to the digital interface 350. Upon receiving a ring-trip indication from the ring-trip detection logic 360, the digital interface 350 terminates the ringing, and the line card 10 thereafter operates in the non-ringing mode until a next ringing signal is transmitted by the digital interface 350. Similarly, assuming that received signal is an AC-fault detection signal, the AC-fault detection logic 355, based on the value calculated by the computation logic 365, performs AC-fault detection. That is, the AC-fault detection logic 355 compares the value with a threshold value, and if the value exceeds the threshold value, the AC-fault detection logic 355 indicates so to the digital interface 350.

Figure 7:
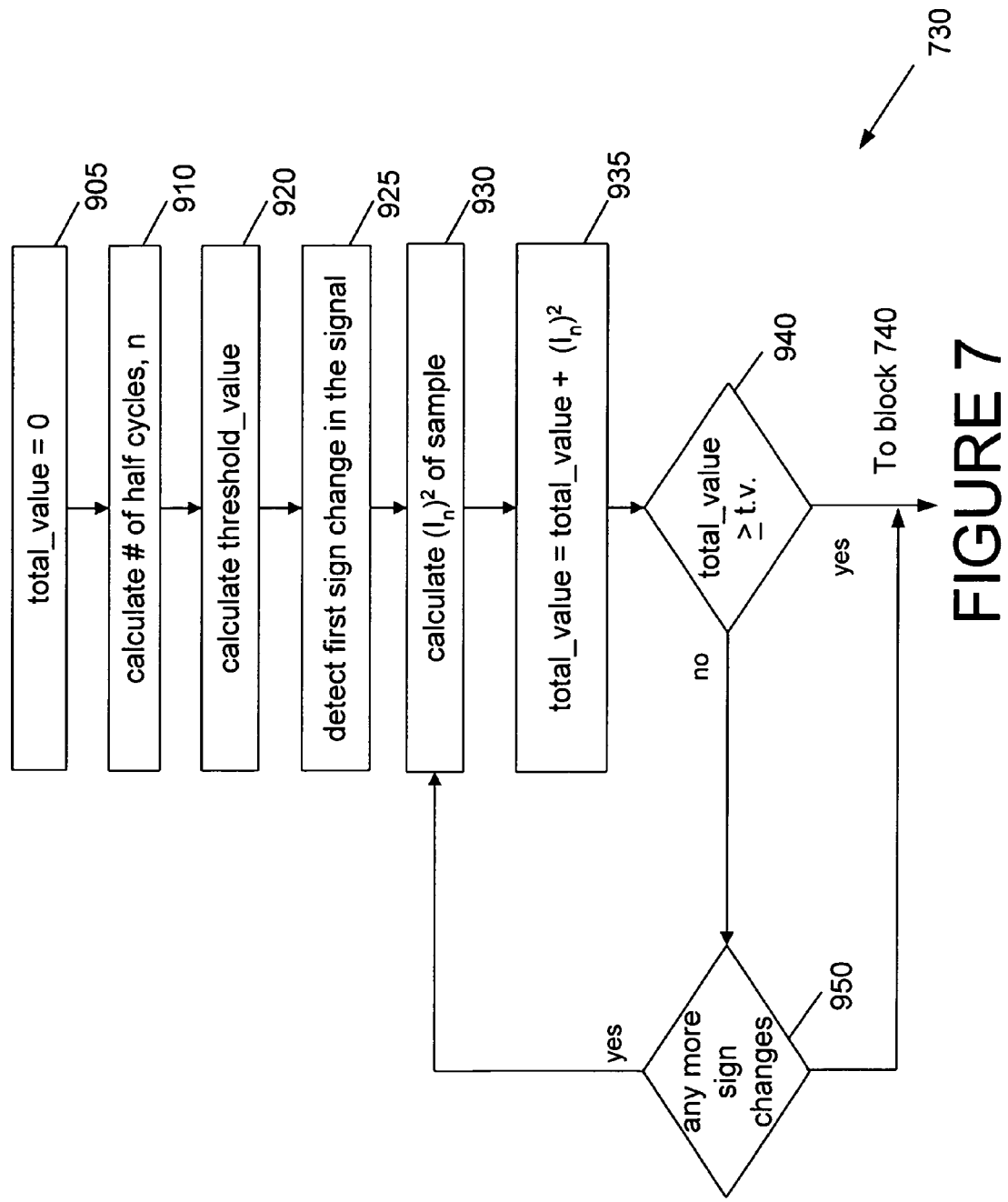
FIG. 7 illustrates an alternative embodiment of the method of FIG. 5.

FIG. 7 illustrates an alternative embodiment of the block 730 of FIG. 5. FIG. 7 illustrates a method in which the computation logic 365, based on a number of half cycles, utilizes the zero crossing technique to calculate the value that is proportional to the power of the AC component. The illustrated method of FIG. 7 terminates upon determining that the value proportional to the power of the AC component is equal or greater than a threshold value. For the purposes of this illustration, it is assumed that the input to the computation logic 365 is an AC current, which, as mentioned above, may represent the received ringing signal or AC-fault detection signal. The method of FIG. 7 begins at block 905, where a "total_value" variable is initialized to zero. At block 910, the computation logic 365 calculates the number of half cycles, n, for which the value $I_n^2$ of will be calculated. The number of half cycles may be a user programmable value. At block 920, the computation logic 365 calculates the threshold value based on the number of half cycles. In this illustrated embodiment, the value of $I_n^2$ may be calculated based on half cycles, and need not be calculated for complete periods.

At block 925, the computation logic 365 detects a first sign change in the AC component (e.g., $I_n$) of the received signal. At block 930, the computation logic 365 calculates the value of $I_n^2$. At block 935, the computation logic 365 keeps a running total of the value of $I_n^2$ by adding the previous samples. At block 940, the computation logic 365 determines if the total_value is equal or greater than the threshold value calculated at block 920. If the total_value is equal or greater than the threshold value, the method, in one embodiment, continues to block 740 of FIG. 5. Thus, the method of FIG. 7 is terminated if the total_value is equal or greater than the threshold value; it is not necessary to compute the total_value for all of the n half cycles. If, however, the total _ value is less than the threshold value, then, at block 950, the computation logic determines if n, the number of half cycles, changes in the AC component of the received signal have occurred. If at the block 950, n sign changes have not yet occurred, an indication that the value of $I_n^2$ has not yet been computed over all of the n half cycles, then, at the block 930, the computation logic 365 continues to calculate the value of the $I_n^2$ for the next cycle. If, at the block 950, there are no additional sign changes, the method of FIG. 7 continues to the block 740 of FIG. 5.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   transmitting a signal having an AC component to a subscriber line;
   receiving at least a portion of the transmitted signal from the subscriber line;
   determining at least a portion of a period of the AC component based on the received signal and further calculating a squared value of the AC component over the determined portion of the period; and
   performing a function of a line card in response to determining at least the portion of the period of the AC component.

2. The method of claim 1, wherein the signal is a ringing signal and wherein performing the function includes at least one of performing ring-trip detection and performing AC-fault detection.

3. The method of claim 1, wherein determining at least the portion of the period includes utilizing the zero crossing technique to determine the period of the AC component.

4. The method of claim 1 wherein the AC component represents AC current, and wherein calculating the squared value comprises calculating the squared value of AC the current.

5. A method, comprising:
   transmitting a signal having at least one of an AC component and a DC component to a subscriber line;
   receiving at least a portion of the transmitted signal from the subscriber line;
   filtering the DC component from the received signal;
   determining a value proportional to a power of the AC component of the received signal over at least a portion of a period of the AC component; and
   performing a function of a line card in response to determining the value proportional to the power of the AC component.

6. The method of claim 5, wherein determining the value proportional to the power of the AC component includes calculating a squared value of the AC component for at least the portion of the period.

7. The method of claim 6, wherein determining at least a portion of a period includes determining at least the portion of the period using zero crossing.

8. The method of claim 6, wherein the squared value of the AC component is calculated until the squared value is at least equal to a threshold value.

9. The method of claim 5, wherein the signal is a ringing signal and wherein performing the function includes performing ring-trip detection.

10. The method of claim 5, wherein the signal is a fault detection signal and wherein performing the function includes performing AC-fault detection.

11. The method of claim 5, wherein the AC component represents AC current, wherein determining the value proportional to the power comprises determining a squared value of the AC current.

12. An apparatus, comprising: circuitry capable of:
   transmitting a signal having an AC component to a subscriber line; and
   receiving at least a portion of the transmitted signal from the subscriber line;
   a digital signal processor capable of determining at least a portion of a period of the AC component based on the received signal and of calculating a squared value of the AC component over the determined portion of the period; and
   the circuitry further capable of performing a function of a line card in response to determining at least the portion of the period of the AC component.

13. The apparatus of claim 12, wherein the signal is a ringing signal and wherein the circuitry capable of performing the function includes the fault detection circuitry capable of performing ring-trip detection.

14. The apparatus of claim 12, wherein the signal is a fault detection signal and wherein the circuitry capable of performing the function includes the fault detection circuitry capable of performing AC-fault detection.

15. The apparatus of claim 12, wherein the digital signal processor capable of determining at least a portion of a period includes the digital signal processor capable of determining the period using zero crossing.

16. An apparatus, comprising: circuitry capable of:
   transmitting a signal having at least one of an AC component and a DC component to a subscriber line; and
   receiving at least a portion of the transmitted signal from the subscriber line;
   a filter capable of filtering the DC component from the received signal;
   a digital signal processor capable of determining a value proportional to a power of the AC component of the received signal over at least a portion of a period of the AC component; and
   the circuitry further capable of performing a function of a line card in response to determining the value proportional to the power of the AC component.

17. The apparatus of claim 16, wherein the digital signal processor capable of determining the value proportional to the power of the AC component includes the digital signal processor capable of calculating a squared value of the AC component for at least the portion of the period.

18. The method of claim 17, wherein the AC component represents AC current, wherein calculating the squared value comprises calculating the squared value of the AC current.

19. The apparatus of claim 17, wherein determining at least the portion of the period includes determining at least the portion of the period using zero crossing.

20. The apparatus of claim 16, wherein the squared value is computed until it is at least equal to a threshold value.

21. The apparatus of claim 16, wherein the signal is a ringing signal and wherein performing the function includes performing ring-trip detection.

22. The apparatus of claim 16, wherein the signal is a fault detection signal and wherein performing the function includes performing AC-fault detection.

23. A line card, comprising:
   a subscriber line interface circuit capable of:
      transmitting a signal having at least one of an AC component and a DC component to a subscriber line; and
      receiving at least a portion of the transmitted signal from the subscriber line;
   a filter capable of filtering the DC component from the received signal;

a digital signal processor capable of determining a value proportional to a power of the AC component of the received signal over at least a portion of a period of the AC component; and the subscriber line interface circuit further capable of performing a function of a line card in response to determining the value proportional to the power of the AC component.

24. The line card of claim 23, wherein the subscriber line interface circuit is a voltage subscriber line interface circuit.

25. The line card of claim 23, wherein the digital signal processor capable of determining the value proportional to the power of the AC component includes the digital signal processor capable of calculating a squared value of the AC component for at least the portion of the period.

26. The apparatus of claim 23, wherein the signal is a ringing signal and wherein performing the function includes performing ring-trip detection.

27. The apparatus of claim 23, wherein the signal is a fault detection signal and wherein performing the function includes performing AC-fault detection.

28. An apparatus, comprising:

means for transmitting a signal having an AC component to a subscriber line;

means for receiving at least a portion of the transmitted signal from the subscriber line;

means for determining at least a portion of a period of the AC component based on the received signal and for calculating a squared value of the AC component over the determined ponion of the period; and means for performing a function of a line card in response to determining at least the portion of the period of the AC component.

* * * * *